Dec. 15, 1942. E. H. PIRON 2,304,847
WHEEL ABRADING MEANS
Filed July 16, 1941
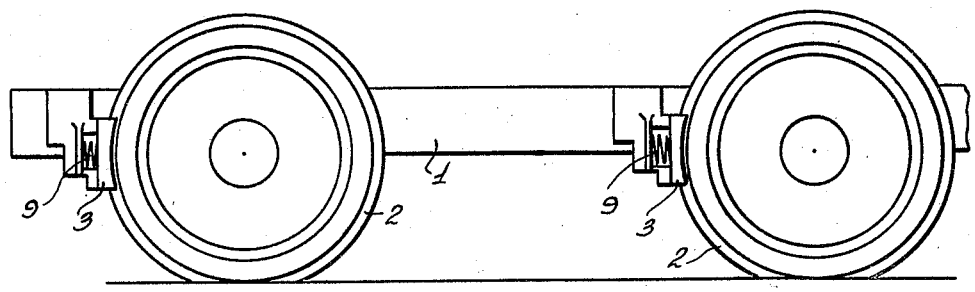
Fig. 1.
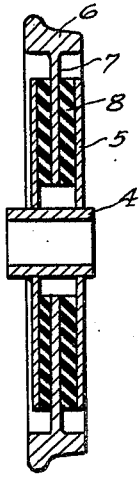
Fig. 2.
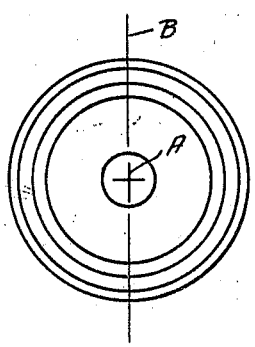 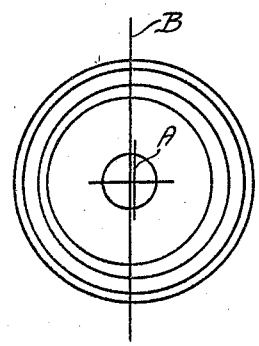 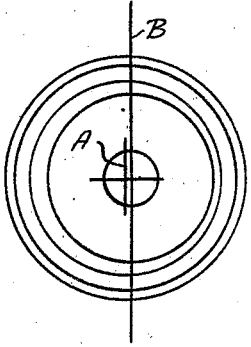
Fig. 3. Fig. 4. Fig. 5.
INVENTOR.
Emil H. Piron
BY Patented Dec. 15, 1942

2,304,847

UNITED STATES PATENT OFFICE 2,304,847

WHEEL ABRADING MEANS

Emil H. Piron, Forest Hills, N. Y., assignor to Transit Research Corporation, New York, N. Y., a corporation of New York Application July 16, 1941, Serial No. 402,711

8 Claims. (Cl. 295—1)

This invention relates to rail vehicles and has for its object to provide means for maintaining smooth the surface of a metallic tire which is subject to pitting and local deformations.

In street cars, for example, the newer type cars do not brake directly on the wheel tires but employ track brakes or drum brakes. It has been proposed to apply an abrasive material against the wheel treads under a constantly acting spring pressure means to scrub or abrade the tread surfaces. The disadvantages of such devices are that they cause undue tread wear, they entail the loss of useful power by constituting a continuous drag, and they become a new source of noise.

Since the newer type cars are equipped with wheels in which the tire is separated from the hub by rubber-like elements stressed in shear under vertical loading, there is a movement of the center of the tire with respect to the axis of the hub under different conditions of operations. Thus under conditions of car acceleration and braking the tire center will move forwardly and rearwardly of the hub respectively. The principal object of this invention is to provide a tread abrading means for resilient wheels which will perform a scrubbing action only when the tire center is displaced in a given direction thereby to obtain intermittent abrading action, to arrange the abrading means for operation preferably during deceleration only so that no useful power is lost, and to thus restrict the use to short intervals in the interest of quietness of operation.

Other objects and advantages will become more fully apparent as reference is had to the accompanying drawing wherein my invention is illustrated, and in which—

Fig. 1 is a schematic view of a rail vehicle truck,

Fig. 2 is a schematic section view of a resilient wheel, and

Figs. 3, 4 and 5 are diagrammatic views illustrating different conditions of operation of the wheel.

More specifically, I designates a rail vehicle truck having wheels 2. Supported on the truck in slightly spaced relation to the rear of the wheels are abrasive shoes 3. A preferred example of an abrasive material is rubber incorporating an abrasive compound such as is the case with rubber cutting wheels, although any other material which can resist the action of and remain effective in the presence of water may be used.

The wheels 1 are of the well known resilient type now in common use on street railway vehicles. As schematically shown in Fig. 2 they comprise a hub 4 having two outwardly radiating plates 5 and a tread 6 having an inwardly radiating plate 7 disposed between the plates 5. The plate 7 is connected to the plates 5 by rubber shear springs 8. With this type of wheel the center A of the tire is located on a vertical line B passing through the center of the hub when the vehicle is coasting, as shown in Fig. 3. When the vehicle is accelerating the center A is located ahead of the line B, as shown in Fig. 4, and when the vehicle is decelerated by braking the center A is located to the rear of the line B.

The abrasive shoes 3 are so positioned that the relative shifting of the tread center with respect to the hub center is sufficient to cause contact between the tread and the abrasive shoes. In order to avoid an excessive pressure between the treads and the abrasive shoes the latter are resiliently supported by springs 9, which may be preloaded.

Although a specific embodiment of the invention has been illustrated and described, it will be understood that various changes may be made within the scope of the appended claims without departing from the spirit of the invention and such changes are contemplated.

What I claim is:

1. A rail vehicle having resilient wheels, having a predetermined range of deflection, abrasive shoes mounted adjacent the wheels and spaced within said predetermined deflection range, and means withholding said shoes from contact with the treads of said wheels where said wheels are concentric with their axes of rotation.

2. A rail vehicle having resilient wheels in which the treads shift with respect to the hubs during acceleration and braking, and abrasive shoes mounted adjacent the wheels to the rear thereof and adapted to be contacted by the treads of the wheels as a result of the relative shifting due to braking.

3. A rail vehicle truck having wheels composed of hubs and treads and resilient means supporting the treads with respect to the hubs in such manner that the axes of the hubs and treads shift relatively during different normal conditions of operation of the vehicle, and abrasive shoes mounted adjacent said wheels at a distance such that they are contacted by the treads of the wheels as a result of said relative shifting of said centers.

4. A rail vehicle truck having wheels composed of hubs and treads and resilient means supporting the treads with respect to the hubs in such manner that the axes of the treads shift to the rear of the centers of the hubs as a result of deceleration of the vehicle, and shoes mounted adjacent the wheels within the range of shifting of the treads and adapted to be contacted by said treads as a result of such shifting.

5. A truck having rail wheel tires and means connecting said tires with the truck in such manner that the tires shift rearwardly relative to the truck as a result of the inertia due to braking, and abrasive shoes mounted on the truck and adapted to be contacted by the wheels when the latter shift rearwardly.

6. A rail vehicle having resilient wheels having a predetermined range of deflection, abrasive shoes and resilient means supporting said shoes adjacent the wheels and spaced therefrom within said predetermined deflection range.

7. A rail vehicle having resilient wheels in which the treads shift with respect to the hubs during acceleration and braking, and abrasive shoes mounted adjacent the wheels to the rear thereof and adapted to be contacted by the treads of the wheels as a result of the relative shifting due to braking, the means which supports said shoes including resilient means for regulating the pressure of contact between the shoes and treads.

8. A truck having rail wheel tires and means connecting said tires with the truck in such manner that the tires shift rearwardly relative to the truck as a result of the inertia due to braking, and abrasive shoes mounted on the truck and adapted to be contacted by the wheels when the latter shift rearwardly, said shoes being supported by resilient means which regulates the pressure of contact between the shoes and the wheels.

EMIL H. PIRON.